(12) United States Patent
Chen (10) Patent No.: US 9,866,128 B2
(45) Date of Patent: Jan. 9, 2018

(54) SEMICONDUCTOR DEVICE AND SWITCHING POWER SUPPLY DEVICE

(71) Applicant: FUJI ELECTRIC CO., LTD., Kawasaki-shi, Kanagawa (JP)

(72) Inventor: Jian Chen, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/361,743

(22) Filed: Nov. 28, 2016

(65) Prior Publication Data
US 2017/0201183 A1    Jul. 13, 2017

(30) Foreign Application Priority Data

Jan. 13, 2016    (JP) ................... 2016-004651

(51) Int. Cl.
  *H02M 3/335*    (2006.01)
  *H02M 1/44*    (2007.01)

(52) U.S. Cl.
  CPC ......... *H02M 3/33546* (2013.01); *H02M 1/44* (2013.01)

(58) Field of Classification Search
  CPC ........... H02M 1/08; H02M 1/36; H02M 1/42; H02M 1/44; H02M 2001/0009; H02M 2001/0048
  See application file for complete search history.

(56) References Cited

U.S. PATENT DOCUMENTS

| | | | | |
|---|---|---|---|---|
| 4,284,938 A * | 8/1981 | Bailey | ................... | H02M 3/137 318/432 |
| 4,518,964 A * | 5/1985 | Hetyei | ............... | G01R 29/0276 342/202 |
| 4,584,580 A * | 4/1986 | Fujino | .................... | G01S 1/045 327/556 |
| 5,212,551 A * | 5/1993 | Conanan | ................ | H04H 20/31 348/469 |
| 5,300,896 A * | 4/1994 | Suesserman | ........ | H03F 3/45475 330/260 |
| 6,441,685 B1 * | 8/2002 | MacMillan | ........... | H03F 3/2171 330/10 |
| 7,382,167 B1 * | 6/2008 | Umminger | ................ | G06F 1/28 327/75 |

(Continued)

FOREIGN PATENT DOCUMENTS

JP    2006-204044 A    8/2006
JP    2012-170218 A    9/2012

*Primary Examiner* — Yusef Ahmed
(74) *Attorney, Agent, or Firm* — Rabin & Berdo, P.C.

(57) ABSTRACT

A semiconductor device including a first filter, a second filter, a first comparison circuit, a second comparison circuit and an AND circuit. The first filter generates a first output signal by performing first filtering processing on an input signal of the semiconductor device, the first filter having a first time constant. The second filter generates a second output signal by performing second filtering processing on the first output signal, the second filter having a second time constant different from the first time constant. The first comparison circuit compares the first output signal with a first threshold voltage, to thereby output a first level signal. The second comparison circuit compares the second output signal with a second threshold voltage, to thereby output a second level signal. The AND circuit performs an AND operation on the first and second level signals.

5 Claims, 11 Drawing Sheets

(56) References Cited

U.S. PATENT DOCUMENTS

| | | | |
|---|---|---|---|
| 9,013,164 B1* | 4/2015 | Lee | H02M 3/158 323/285 |
| 9,484,871 B1* | 11/2016 | He | H03H 11/126 |
| 2006/0164872 A1* | 7/2006 | Fukumoto | H02M 3/33523 363/21.04 |
| 2011/0317322 A1* | 12/2011 | Chien | H02H 7/12 361/90 |
| 2013/0236206 A1* | 9/2013 | Shoji | G03G 15/80 399/88 |
| 2014/0159688 A1* | 6/2014 | Peker | H02M 3/1582 323/282 |
| 2014/0218978 A1* | 8/2014 | Heuken | H05B 33/0818 363/21.16 |
| 2014/0354159 A1* | 12/2014 | Zhang | H05B 33/0815 315/127 |
| 2015/0207419 A1* | 7/2015 | Kyono | H02M 3/33507 363/17 |
| 2015/0274099 A1* | 10/2015 | Boucly | H02M 1/08 307/10.1 |
| 2015/0365006 A1* | 12/2015 | Choi | H02M 3/33592 363/21.02 |
| 2016/0336851 A1* | 11/2016 | Li | H02M 1/32 |

* cited by examiner

SEMICONDUCTOR DEVICE AND SWITCHING POWER SUPPLY DEVICE

CROSS-REFERENCE TO RELATED APPLICATION

This application is based upon and claims the benefit of priority of the prior Japanese Patent Application No. 2016-004651, filed on Jan. 13, 2016, the entire contents of which are incorporated herein by reference.

BACKGROUND OF THE INVENTION

1. Field of the Invention

The embodiments discussed herein relate to a semiconductor device and a switching power supply device.

2. Background of the Related Art

Since current-resonance-type DC-DC switching converters can suitably be improved in efficiency and width, these converters are widely used in power supply adapters in televisions, for example. A switching power supply device including such a switching converter is able to maintain its output voltage at a constant level. In addition, when the load is light, the switching power supply device is able to perform automatic burst control, in order to improve its efficiency.

The automatic burst control is a control method in which a load status indicating whether the load is heavy or light is detected. More specifically, when the load becomes light, a normal operation is switched to a burst operation in which switching is temporarily stopped. When the load becomes heavy, the burst operation is switched back to the normal operation.

As a conventional technique, there has been proposed a technique in which a load component of a current that flows through a resonance circuit is detected in synchronization with an on-period of a high-side switching element or a low-side switching element (see Japanese Laid-open Patent Publication No. 2012-170218, for example).

According to another technique proposed, when the load is light, an on-width of a first switching element or a second switching element connected in series with a DC power supply is made less than that when the load is not light on the basis of a level of detection signal of an output voltage detection circuit (see Japanese Laid-open Patent Publication No. 2006-204044, for example).

However, with the circuit configurations of these conventional switching power supply devices, when the load is suddenly changed (when the load is suddenly changed from light to heavy), the burst operation is not promptly canceled. Namely, the conventional switching power supply devices have a problem that large undershoot of their output voltages is caused. If large undershoot is caused, unnecessary electromagnetic radiation noise is increased. In the worst case, elements could be destroyed.

SUMMARY OF THE INVENTION

According to one aspect, there is provided a semiconductor device including: a first filter that generates a first output signal by performing first filtering processing on an input signal; a second filter that has a second time constant different from a first time constant of the first filter and generates a second output signal by performing second filtering processing on the first output signal; a first comparison circuit that outputs a first level signal, based on a comparison between the first output signal and a first threshold voltage; a second comparison circuit that outputs a second level signal, based on a comparison between the second output signal and a second threshold voltage; and an AND circuit that performs an AND operation between the first level signal and the second level signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Hereinafter, embodiments will be described in detail below with reference to the accompanying drawings, wherein like reference characters refer to like elements throughout. An individual embodiment may be realized by combining a plurality of embodiments, as long as the combination does not cause contradiction. In the following description, the name of an individual terminal and a voltage, a signal, etc. at that terminal will be described by using the same reference character, as needed.

Figure 1A:
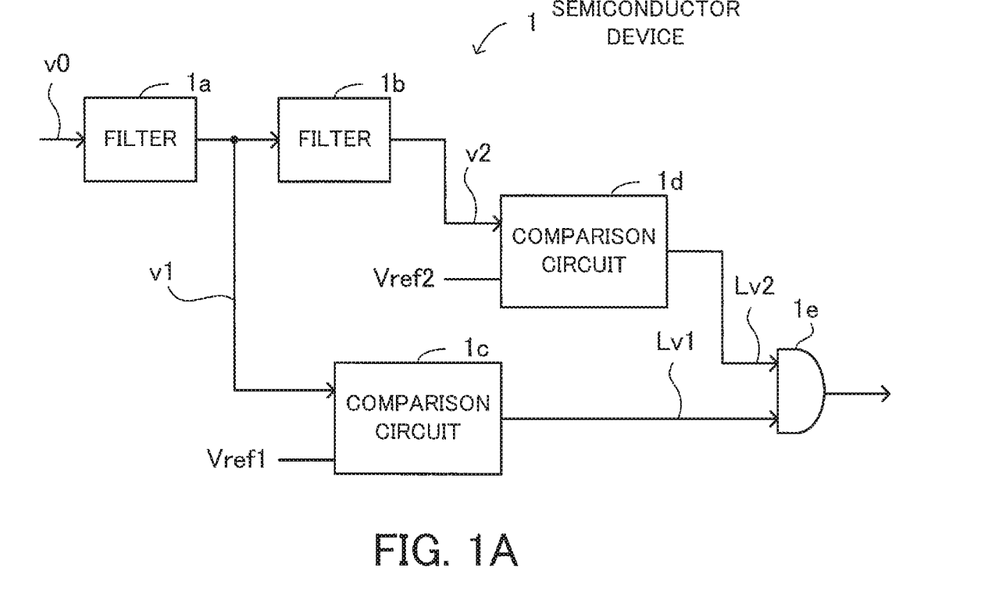
FIG. 1A illustrates a configuration example of a semiconductor device.

FIG. 1A illustrates a configuration example of a semiconductor device 1. The semiconductor device 1 includes a filter 1a (a first filter), a filter 1b (a second filter), a comparison circuit 1c (a first comparison circuit), a comparison circuit 1d (a second comparison circuit), and an AND circuit 1e.

The filter 1a generates an output signal v1 (a first output signal) by performing first filtering processing on an input signal v0. The filter 1b has a second time constant, which is different from a first time constant of the filter 1a, and generates an output signal v2 (a second output signal) by performing second filtering processing on the output signal v1.

The comparison circuit 1c outputs a level signal Lv1 (a first level signal), based on a comparison between the output signal v1 and a threshold voltage Vref1 (a first threshold voltage). The comparison circuit 1*d* outputs a level signal Lv2 (a second level signal), based on a comparison between the output signal v2 and a threshold voltage Vref2 (a second threshold voltage). The AND circuit 1*e* performs an AND operation between the level signal Lv1 and the level signal Lv2.

Figure 1B:
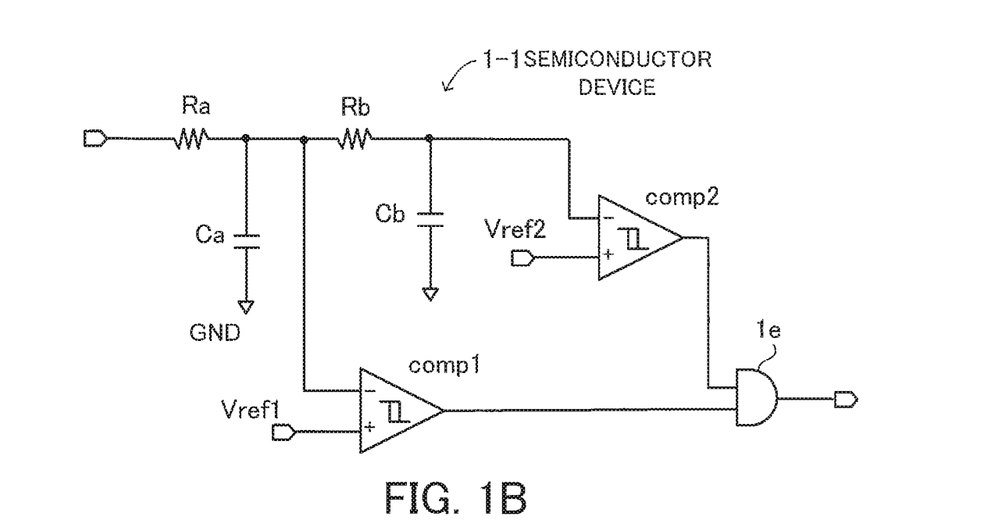
FIG. 1B illustrates a specific circuit configuration example of a semiconductor device.

FIG. 1B illustrates a specific circuit configuration example of a semiconductor device 1-1. The semiconductor device 1-1 includes hysteresis comparators comp1 and comp2, resistors Ra and Rb, capacitors Ca and Cb, and an AND circuit 1*e*.

The resistor Ra and the capacitor Ca form the filter 1*a*, and the resistor Rb and the capacitor Cb form the filter 1*b*. In addition, the hysteresis comparator comp1 corresponds to the comparison circuit 1*c*, and the hysteresis comparator comp2 corresponds to the comparison circuit 1*d*.

One end of the resistor Ra is connected to an input terminal, and the other end of the resistor Ra is connected to one end of the capacitor Ca, a negative input terminal of the hysteresis comparator comp1, and one end of the resistor Rb. The other end of the resistor Rb is connected to one end of the capacitor Cb and a negative input terminal of the hysteresis comparator comp2. The other end of each of the capacitors Ca and Cb is connected to ground (which will hereinafter be referred to as GND).

A positive input terminal of the hysteresis comparator comp1 receives the threshold voltage Vref1, and a positive input terminal of the hysteresis comparator comp2 receives the threshold voltage Vref2. Each of the hysteresis comparators comp1 and comp2 has an output terminal connected to an input terminal of the AND circuit 1*e*, and the AND circuit 1*e* has an output node that is connected to an output terminal.

Figure 2:
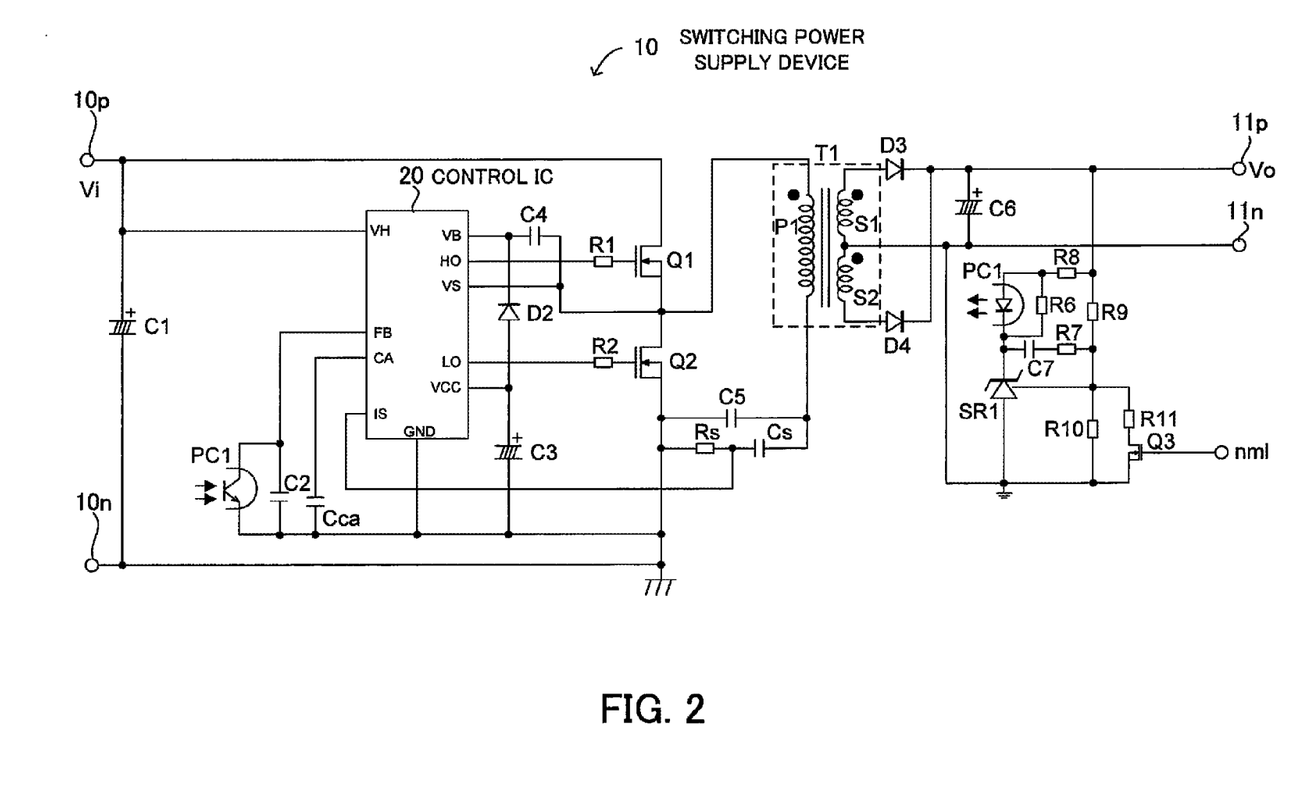
FIG. 2 illustrates a configuration example of a switching power supply device.

Next, a switching power supply device to which the above semiconductor device is applied will be described. FIG. 2 illustrates a configuration example of a switching power supply device 10. The switching power supply device 10 has input terminals 10*p* and 10*n* to which an input capacitor C1 is connected. For example, these input terminals 10*p* and 10*n* receive a DC input voltage Vi, which is a constant and high voltage generated by a power factor improvement circuit.

The input terminals 10*p* and 10*n* are connected to a series circuit of a high-side switching element Q1 (a first switching element) and a low-side switching element Q2 (a second switching element), forming a half-bridge circuit. In the example in FIG. 2, N channel metal-oxide-semiconductor field-effect transistors (MOSFETs) are used as the switching elements Q1 and Q2.

A connection point of the switching elements Q1 and Q2 is connected to one end of a primary winding P1 of a transformer T1 (a resonance reactor), and the other end of the primary winding P1 is connected to GND via a resonance capacitor C5.

The leakage inductance component and the resonance capacitor C5 arranged between the primary winding P1 and the secondary windings S1 and S2 of the transformer T1 form a resonance circuit. Alternatively, the leakage inductance may not be used. More specifically, another inductance, which is different from the inductance of the transformer T1, may be connected in series with the resonance capacitor C5. In this way, this connected inductance is used as the resonance reactance of the resonance circuit.

One end of the secondary winding S1 of the transformer T1 is connected to an anode terminal of a diode D3, and one end of the secondary winding S2 is connected to an anode terminal of a diode D4. Cathode terminals of the diodes D3 and D4 are connected to a positive terminal of an output capacitor C6 and an output terminal 11*p*.

A negative terminal of the output capacitor C6 is connected to a connection point of the secondary windings S1 and S2 and to an output terminal 11*n*. The secondary windings S1 and S2, the diodes D3 and D4, and the output capacitor C6 form a circuit that converts an AC voltage generated across the secondary windings S1 and S2 into a DC voltage by rectifying and smoothing the AC voltage. Namely, these elements form an output circuit of the switching power supply device.

The positive terminal of the output capacitor C6 is connected to an anode terminal of a light emitting diode of a photocoupler PC1 via a resistor R8. A cathode terminal of the light emitting diode is connected to a cathode terminal of a shunt regulator SR1.

A resistor R6 is connected in parallel with the anode terminal and cathode terminal of the light emitting diode. An anode terminal of the shunt regulator SR1 is connected to the output terminal 11*n*.

The shunt regulator SR1 has a reference terminal that is connected to a connection point between resistors R9 and R10 connected in series with each other between the positive terminal and the negative terminal of the output capacitor C6.

A series circuit of a resistor R7 and a capacitor C7 is connected between the reference terminal and the cathode terminal of the shunt regulator SR1. This shunt regulator SR1 is to cause a current to flow through the light emitting diode. This current is based on the difference between a potential obtained by dividing an output voltage Vo (a voltage across the output capacitor C6) and an internal reference voltage.

A phototransistor of the photocoupler PC1 has a collector terminal connected to an FB terminal of a control IC 20 (a control circuit) and has an emitter terminal connected to GND. A capacitor C2 is connected in parallel with the collector terminal and the emitter terminal.

The control IC 20 includes a VH terminal connected to a positive terminal of the input capacitor C1 and a GND terminal connected to GND. In addition, the control IC 20 includes an HO terminal connected to a gate terminal of the switching element Q1 via a resistor R1 and an LO terminal connected to a gate terminal of the switching element Q2 via a resistor R2. In addition, the control IC 20 includes a VB terminal, a VS terminal, a CA terminal, an IS terminal, and a VCC terminal.

A capacitor C4 is connected between the VB terminal and the VS terminal, and the VS terminal is connected to the connection point of the switching elements Q1 and Q2. The CA terminal is connected to one end of a capacitor Cca, and the other end of the capacitor Cca is connected to GND. The IS terminal is connected to a connection point of a series circuit of a capacitor Cs and a resistor Rs that are connected in parallel with the resonance capacitor C5.

The VCC terminal is connected to a positive terminal of a capacitor C3, and a negative terminal of the capacitor C3 is connected to GND. The VCC terminal is also connected to an anode terminal of a diode D2, and a cathode terminal of this diode D2 is connected to the VB terminal.

The VCC terminal is also connected to an auxiliary winding of the transformer T1 via a diode. However, for the sake of simplicity, this connection is not illustrated in FIG. 2. After this switching power supply device is started, a voltage generated across the auxiliary winding is used as a power supply of the control IC 20.

The series circuit of the capacitor Cs and the resistor Rs connected in parallel with the resonance capacitor C5 is a shunt circuit that divides a resonance current. The current obtained by this shunt circuit is converted by a current detection resistor Rs into a voltage signal, which is then inputted to the IS terminal of the control IC 20.

The resonance currents that flow through the resonance capacitor C5 and the capacitor Cs have substantially the same waveform, and the maximum amplitude of the resonance currents is determined by a capacitance ratio between the resonance capacitor C5 and the capacitor Cs. If the capacitance of the capacitor Cs is smaller than that of the resonance capacitor C5, only a very small current flows through the current detection resistor Rs. Namely, power consumption needed for the current detection can be reduced to a negligible level.

Figure 3:
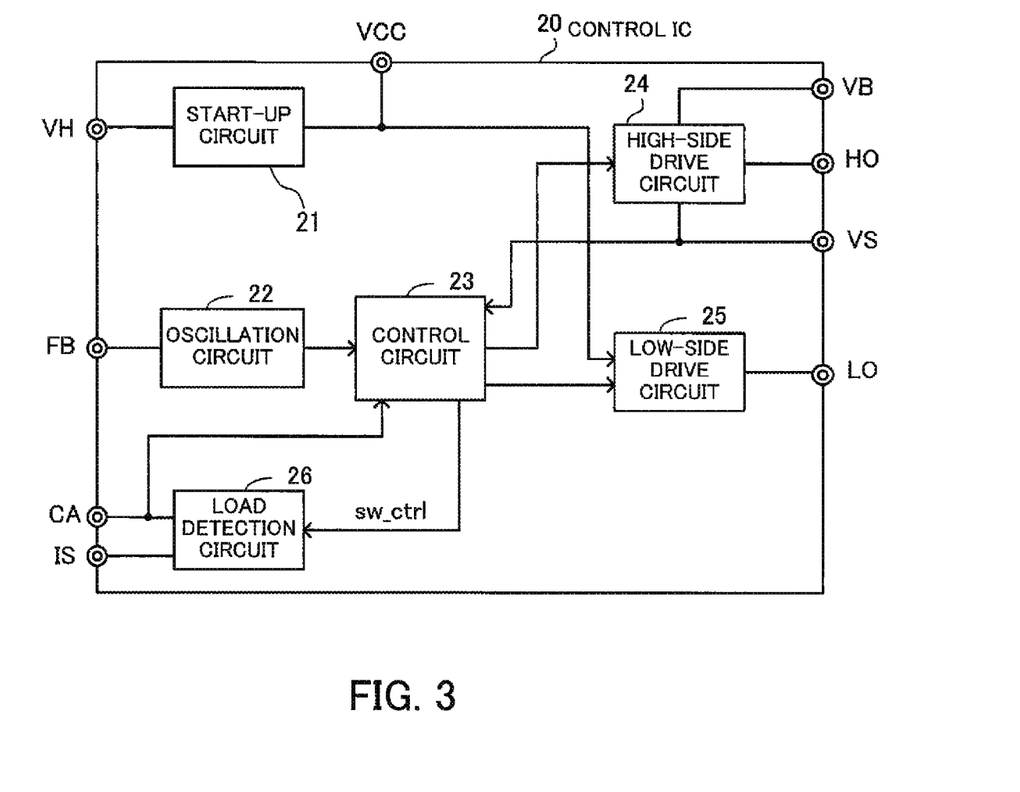
FIG. 3 illustrates a configuration example of a control IC.

FIG. 3 illustrates a configuration example of the control IC 20. The control IC 20 includes a start-up circuit 21, an oscillation circuit 22, a control circuit 23, a high-side drive circuit 24, a low-side drive circuit 25, and a load detection circuit 26.

An input terminal of the start-up circuit 21 is connected to the VH terminal, and an output terminal of the start-up circuit 21 is connected to the VCC terminal. An input terminal of the oscillation circuit 22 is connected to the FB terminal, and an output terminal of the oscillation circuit 22 is connected to the control circuit 23. The FB terminal is pulled up to a reference voltage (not illustrated) via a resistor (not illustrated).

A high-side output terminal of the control circuit 23 is connected to an input terminal of the high-side drive circuit 24, and a low-side output terminal of the control circuit 23 is connected to an input terminal of the low-side drive circuit 25.

An output terminal of the high-side drive circuit 24 is connected to the HO terminal, and an output terminal of the low-side drive circuit 25 is connected to the LO terminal. The high-side drive circuit 24 is connected to the VB terminal, which is brought to a high-side power supply, and to the VS terminal, which is brought to a high-side reference potential.

The VS terminal is connected to the control circuit 23, and a signal VS is supplied to the control circuit 23 via the VS terminal. The CA terminal is connected to the control circuit 23 and the load detection circuit 26. The load detection circuit 26 is connected to the IS terminal and the control circuit 23. The load detection circuit 26 receives a signal sw_ctrl from the control circuit 23.

Figure 4:
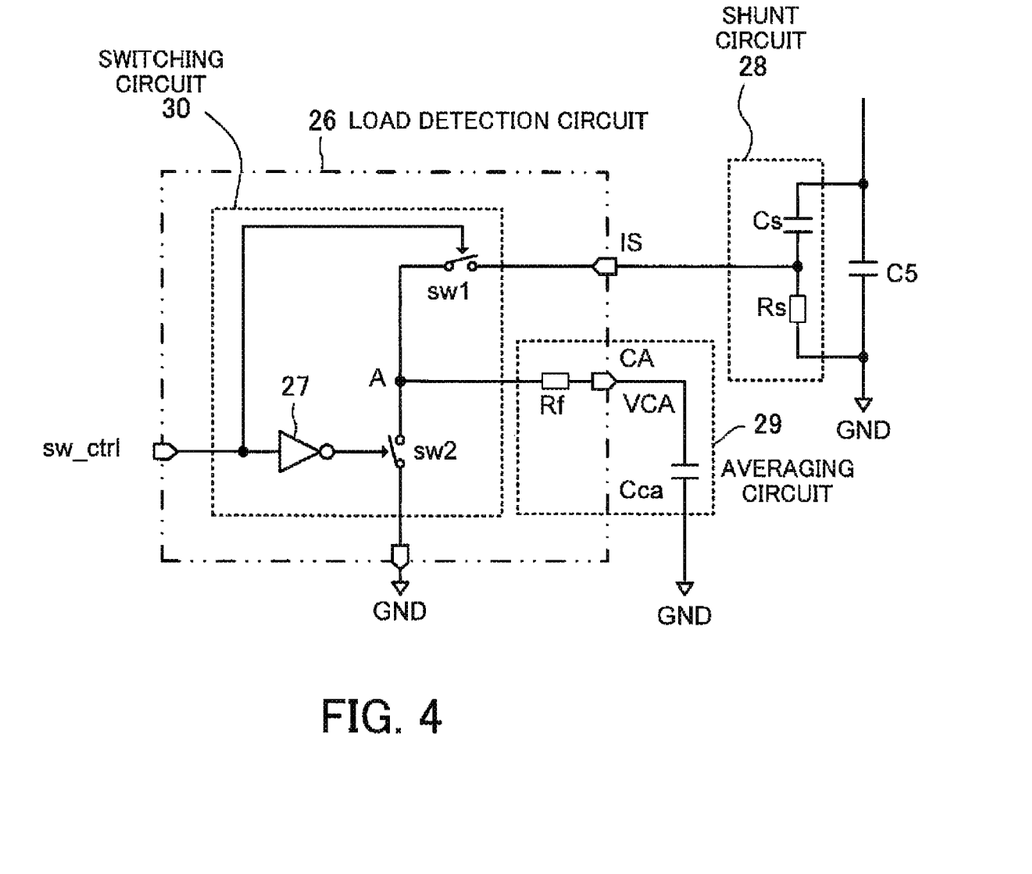
FIG. 4 illustrates a configuration example of a load detection circuit.

FIG. 4 illustrates a configuration example of the load detection circuit 26. The load detection circuit 26 includes switches sw1 and sw2 connected in series with each other. One terminal of the switch sw1 is connected to an IS terminal of the load detection circuit 26, and one terminal of the switch sw2 is connected to a GND terminal of the load detection circuit 26.

The IS terminal is connected to the shunt circuit 28 including the capacitor Cs and the resistor Rs and receives a signal IS obtained by converting the resonance current into a voltage signal. A point A, which is a connection point of the switches sw1 and sw2, is connected to the CA terminal of the load detection circuit 26 via a resistor Rf.

The CA terminal is connected to the capacitor Cca, and an averaging circuit 29 including the resistor Rf and the capacitor Cca performs averaging on a voltage signal A at the point A. A control terminal of the switch sw1 is connected to a sw_ctrl terminal that receives the signal sw_ctrl from the control circuit 23, and a control terminal of the switch sw2 is connected to the sw_ctrl terminal via an inverter circuit 27.

The switches sw1 and sw2 and the inverter circuit 27 form a switching circuit 30 and generate the voltage signal A proportional to the input current by using the signal IS or the like at the point A.

Next, an operation of the switching power supply device 10 will be described. Before the control IC 20 starts switching control, the start-up circuit 21 that receives the DC input voltage Vi charges the capacitor C3 by supplying a start current to the capacitor C3. Thus, a voltage VCC is applied to the VCC terminal and the low-side drive circuit 25. When the control IC 20 starts switching control, the voltage VCC is applied from the auxiliary winding of the transformer T1.

On the basis of the output voltage Vo of the output circuit on the side of the secondary windings S1 and S2 of the transformer T1, the control IC 20 alternately activates the switching element Q1 and the switching element Q2 so that the output voltage Vo is maintained at a predetermined value. To this end, the shunt regulator SR1 detects the output voltage Vo and outputs a current corresponding to the difference from the predetermined value. In addition, the current corresponding to the difference is fed back to the FB terminal of the control IC 20 by the photocoupler PC1.

In the control IC 20, on the basis of the signal FB of the FB terminal, the oscillation circuit 22 adjusts its oscillation frequency, and the control circuit 23 outputs a signal that alternately activates the switching elements Q1 and Q2 to the high-side drive circuit 24 and the low-side drive circuit 25.

As a result, the switching elements Q1 and Q2 are alternately activated, and the charging and discharging periods of the resonance capacitor C5 are changed. Thus, since the amount of power induced on the secondary side of the transformer T1 is adjusted, the output voltage Vo is controlled to be a predetermined value.

The current supplied from the DC input voltage Vi when the switching element Q1 is on is equal to the current that flows through the resonance capacitor C5 and the capacitor Cs. In contrast, the current supplied from the DC input voltage Vi when the switching element Q1 is off is, of course, zero. However, in this state, too, since a resonance current flows through the resonance capacitor C5 and the capacitor Cs, the resonance current must not be detected as the input current in this period. Instead, an accurate input current, namely, zero, needs to be detected.

When the load detection circuit 26 is used, first, the resonance current is detected by the shunt circuit 28. With this detection by using current division, there is no need to insert a current detection resistor in the path through which the resonance current flows. Thus, since little loss is caused, a highly efficient operation is performed. The resonance current detected by the shunt circuit 28 is converted by the resistor Rs into the voltage signal IS, which is then inputted to the IS terminal.

This signal IS is inputted to the switching circuit 30. Since a GND level signal is also inputted to the switching circuit 30, the voltage signal A proportional to the input current can be obtained even when the switching element Q1 is off.

This switching circuit 30 controls signal switching by using the signal sw_ctrl from the control circuit 23. In the present embodiment, the signal sw_ctrl is generated on the basis of the signal VS, which is brought to the high-side reference potential, in the control circuit 23.

Figure 5:
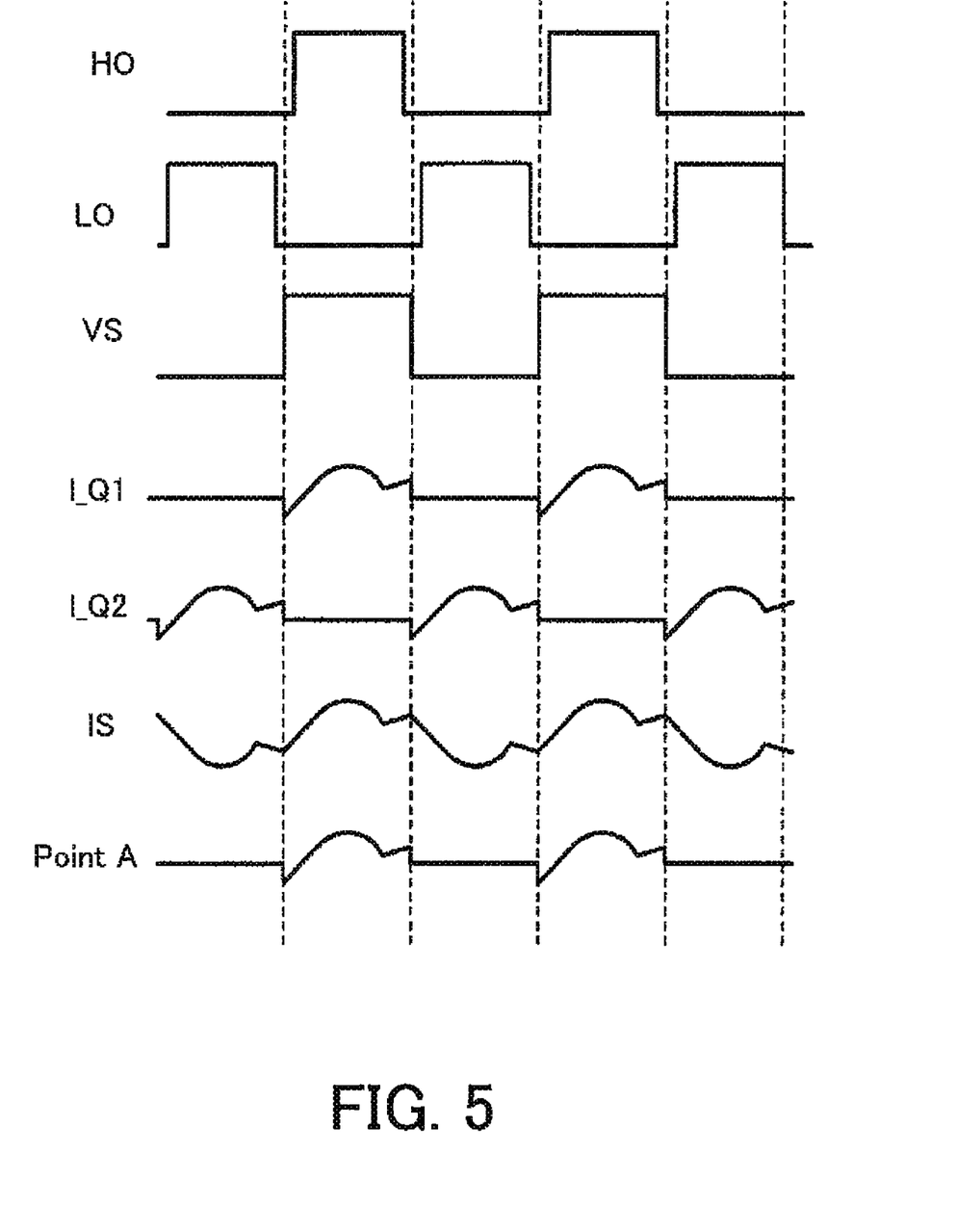
FIG. 5 is a timing chart when a normal operation is performed.

FIG. 5 is a timing chart when a normal operation is performed. The signal VS has the same period as the period of on and off of the switching element Q1. An individual rising edge of the signal HO that drives the switching element Q1 lags a corresponding rising edge of the signal VS by dead time, and an individual falling edge of the signal HO leads a corresponding falling edge of the signal VS by the dead time.

The control circuit 23 supplies this signal VS to the switching circuit 30 as the signal sw_ctrl. The signal VS represents a high (H) level between its rising and falling edges and represents a low (L) level between its falling and rising edges.

While the signal sw_ctrl represents an H level, namely, from when the signal sw_ctrl rises to when the signal sw_ctrl falls, the switching circuit 30 maintains the switch sw1 in an on-state. In this state, since the logic of the signal sw_ctrl is inverted by the inverter circuit 27, the switch sw2 is maintained in an off-state. In addition, while the signal sw_ctrl represents an L level, namely, from when the signal sw_ctrl falls to when the signal sw_ctrl rises, the switch sw1 is maintained in an off-state, and the switch sw2 is maintained in an on-state.

Thus, while the signal sw_ctrl represents an H level, the signal IS, namely, a voltage (a first voltage signal) proportional to a current I_Q1 that flows through the high-side switching element Q1, is applied to the point A.

In contrast, while the signal sw_ctrl represents an L level, since the switch sw1 is off and the switch sw2 is on, a GND level signal (a second voltage signal) that indicates that the input current is zero is applied to the switching circuit 30.

Thus, the point A is switched to a GND level voltage signal A (a third voltage signal). The voltage signal A (the third voltage signal) at the point A switched by the signal sw_ctrl is subjected to averaging performed by the averaging circuit 29, and a voltage signal VCA proportional to the average value of the values of the input current is generated at the CA terminal.

As described above, with the load detection circuit 26, a first signal proportional to the current I_Q1 that flows when the high-side switching element Q1 is on and a GND level second signal indicating that the input current is zero when the switching element Q1 is off is averaged by the averaging circuit 29.

By adding the GND level when the switching element Q1 is off to the averaging performed by the averaging circuit 29, the average value of the values of the input current of the switching power supply device, namely, the load status of the switching power supply device, can accurately be detected.

The average value detected in this way is supplied from the CA terminal to the control circuit 23 as a signal indicating the load status. For example, when the control circuit 23 receives the voltage signal VCA and recognizes that the load is light, the control circuit 23 switches the operation to a burst operation.

Figure 6:
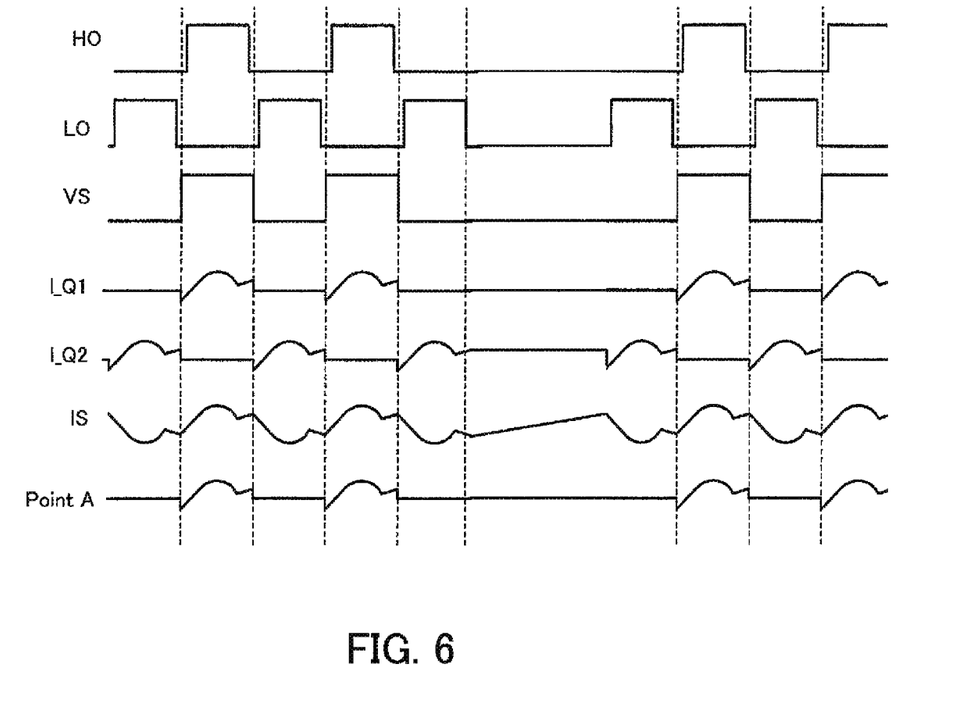
FIG. 6 is a timing chart when a burst operation is performed.

FIG. 6 is a timing chart when a burst operation is performed. When the switching power supply device performs the burst operation, the point A is brought to a GND level during the burst operation. Thus, since the load detection circuit 26 detects the average value of the values of the input current of the switching power supply device in consideration of the GND level during the burst operation, this switching power supply device is able to manage burst control.

Figure 7:
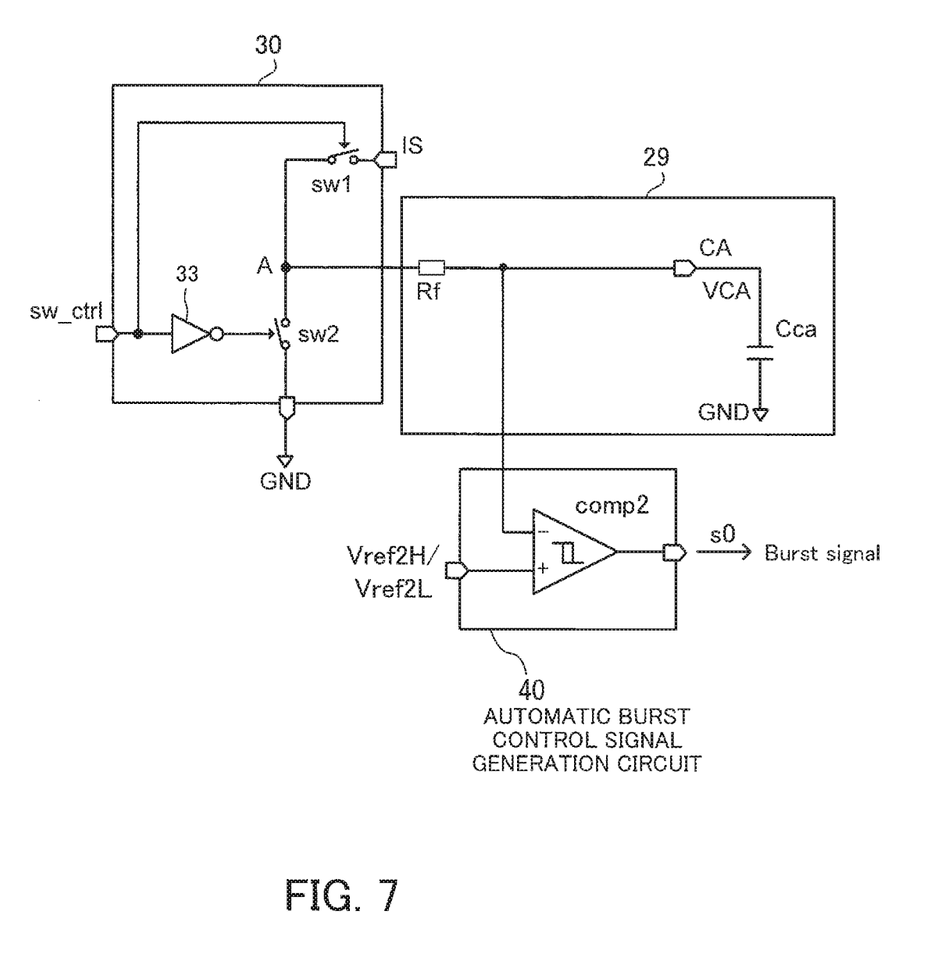
FIG. 7 illustrates a configuration example of an automatic burst control signal generation circuit.

Next, a problem solved by the present embodiment will be described. FIG. 7 illustrates a configuration example of an automatic burst control signal generation circuit. FIG. 7 illustrates a circuit configuration that causes large undershoot of the output voltage when the load is suddenly changed (when the load is suddenly changed from light to heavy).

The automatic burst control signal generation circuit 40 includes a hysteresis comparator comp2 having a negative input terminal connected to a CA terminal and having a positive input terminal to which reference voltages Vref2H and Vref2L are applied.

The automatic burst control signal generation circuit 40 generates an automatic burst control signal (Burst signal) s0 by using a voltage signal VCA proportional to the average value of the values of the input currents. When the voltage signal VCA is smaller than the reference voltage Vref2L and until the voltage signal VCA reaches the reference voltage Vref2H from a value smaller than the reference voltage Vref2L, the automatic burst control signal s0 represents an H level. Thus, a burst operation is performed.

In addition, when the voltage signal VCA is larger than the reference voltage Vref2H and until the voltage signal VCA reaches the reference voltage Vref2L from a value larger than the reference voltage Vref2H, the automatic burst control signal s0 represents an L level. Thus, a normal operation is performed.

Figure 8:
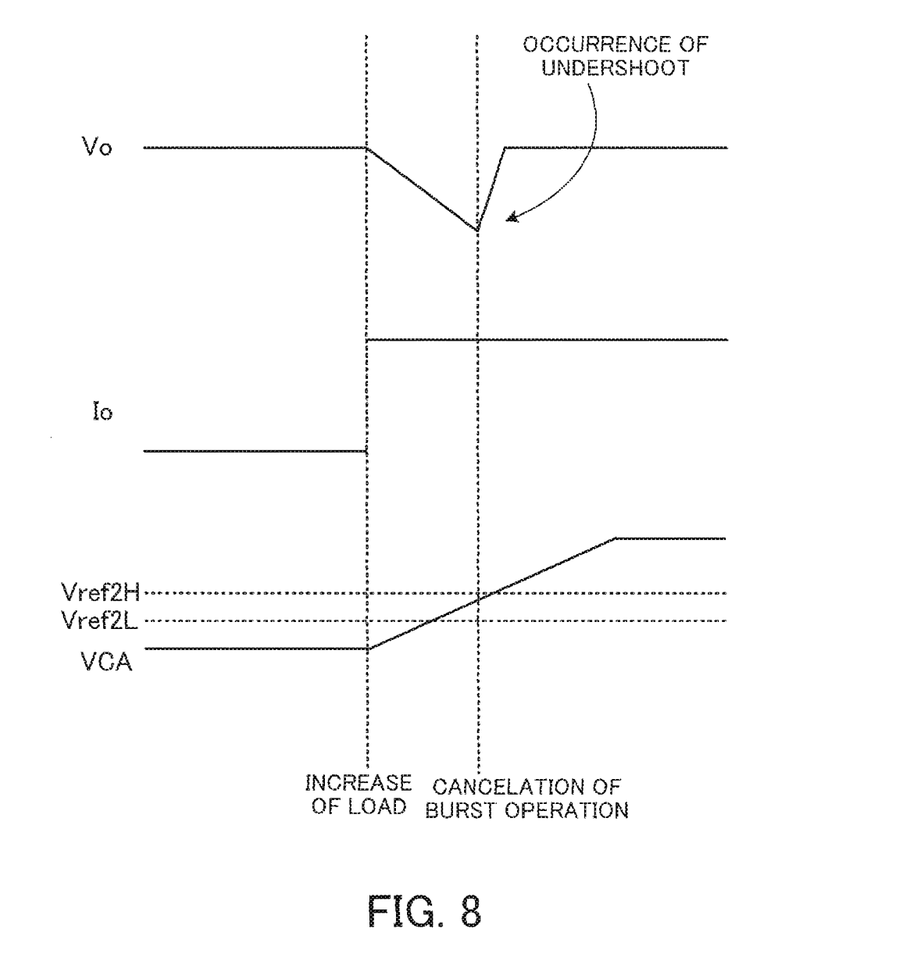
FIG. 8 is a timing chart illustrating undershoot of an output voltage.

FIG. 8 is a timing chart illustrating undershoot of the output voltage. FIG. 8 illustrates change of the output voltage Vo, an output current Io, and the voltage signal VCA of the switching power supply device.

A large time constant is set for a filter formed by a capacitor Cca and a resistor Rf in an averaging circuit 29 in FIG. 7 (to stabilize the voltage signal VCA, the time constant of the filter formed by the capacitor Cca and the resistor Rf is set to 10 ms, for example). Thus, much time is taken from sudden change of the load to cancelation of the burst operation. Namely, when the load is suddenly increased, the burst operation is not canceled promptly. Thus, until the voltage signal VCA reaches the voltage at which the burst operation is canceled, large undershoot of the output voltage Vo is caused.

Thus, the automatic burst control signal generation circuit 40 as illustrated in FIG. 7 needs much time between a sudden change of the load to cancelation of a burst operation. Thus, the automatic burst control signal generation circuit 40 has a problem that large undershoot of the output voltage Vo is caused when the load is suddenly changed.

Next, an automatic burst control signal generation circuit according to the present embodiment will be described. According to the present embodiment, the time taken from sudden change of the load to cancelation of the burst operation is shortened, and therefore, the undershoot of the output voltage is reduced.

Figure 9:
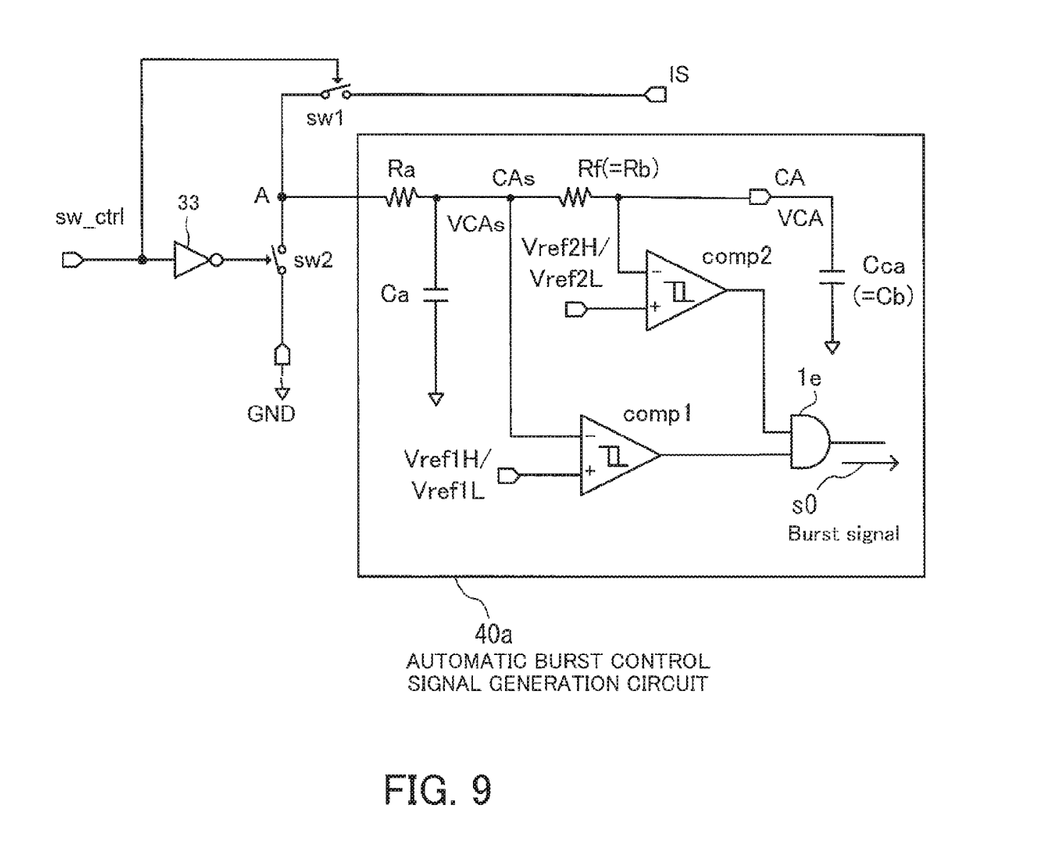
FIG. 9 illustrates a configuration example of an automatic burst control signal generation circuit according to the present embodiment.

FIG. 9 illustrates a configuration example of an automatic burst control signal generation circuit 40a according to the present embodiment. The automatic burst control signal generation circuit 40a includes hysteresis comparators comp1 and comp2, an AND circuit 1e, resistors Rf and Ra, and capacitors Cca and Ca. The resistor Rf corresponds to the resistor Rb illustrated in FIG. 1B, and the capacitor Cca corresponds to the capacitor Cb illustrated in FIG. 1B. The automatic burst control signal generation circuit 40a additionally includes the hysteresis comparator comp1, the AND circuit 1e, the resistor Ra, and the capacitor Ca in addition to the elements in the automatic burst control signal generation circuit 40 illustrated in FIG. 7.

Regarding the connection relationship of these added elements, one end of the resistor Ra is connected to the point A, and the other end of the resistor Ra is connected to one end of the capacitor Ca, a negative input terminal of the hysteresis comparator comp1, and one end of the resistor Rf. The other end of the capacitor Ca is connected to GND, and a positive input terminal of the hysteresis comparator comp1 is connected to reference voltages Vref1H and Vref1L.

In addition, the hysteresis comparators comp1 and comp2 have output terminals connected to input terminals of the AND circuit 1e, respectively. The AND circuit 1e has an output terminal that outputs an automatic burst control signal (Burst signal) s0.

Figure 10:
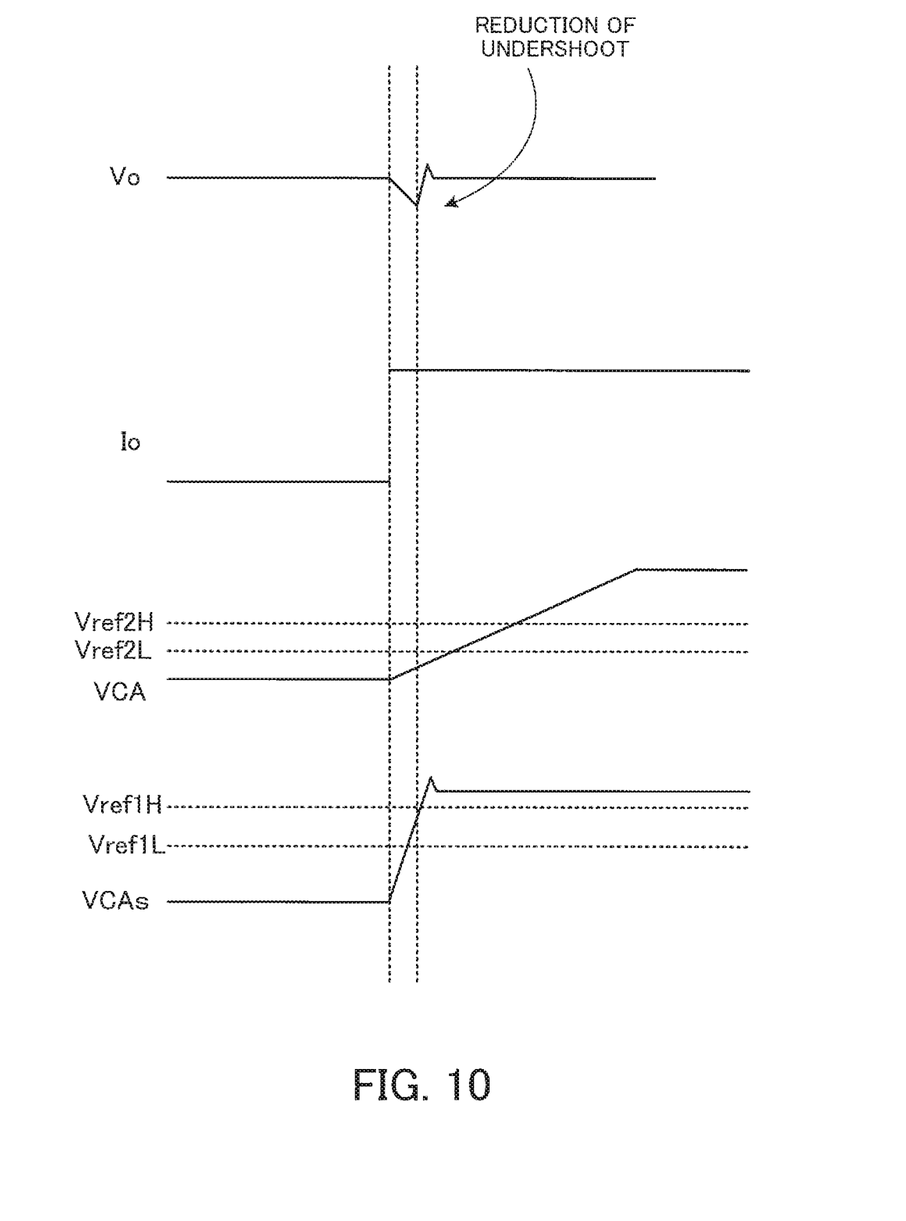
FIG. 10 is a timing chart illustrating improved undershoot of an output voltage.

FIG. 10 is a timing chart illustrating improved undershoot of the output voltage. FIG. 10 illustrates change of the output voltage Vo, the output current Io, the voltage signal VCA, and the voltage signal VCAs at a point CAs of the switching power supply device.

By additionally including a filter formed by the capacitor Ca and the resistor Ra, the filter having a time constant smaller than that of the filter formed by the capacitor Cca and the resistor Rf, the automatic burst control signal generation circuit 40a detects change of the load promptly. The time constant of this filter is, for example, 100 μs (for example, resistor Ra=1 MΩ and capacitor Ca=100 pF).

The relationship between the reference voltages Vref1H and Vref1L of the hysteresis comparator comp1 and the reference voltages Vref2H and Vref2L of the hysteresis comparator comp2 is Vref2H>Vref1H and Vref2L>Vref1L.

In the circuit illustrated in FIG. 7, the automatic burst control signal s0 is generated from the filter having a large time constant. In contrast, in the present embodiment, as illustrated in FIG. 9, a filter having a small time constant is added to the original filter having a large time constant, and the automatic burst control signal s0 is generated by causing the AND circuit 1e to perform an AND operation between the output signals of the two filters.

By using the circuit configuration of the automatic burst control signal generation circuit 40a illustrated in FIG. 9, the time taken from sudden change of the load to cancelation of the burst operation is shortened. Thus, even when the load is suddenly increased, since the burst operation is canceled promptly, the undershoot of the output voltage is reduced.

Figure 11:
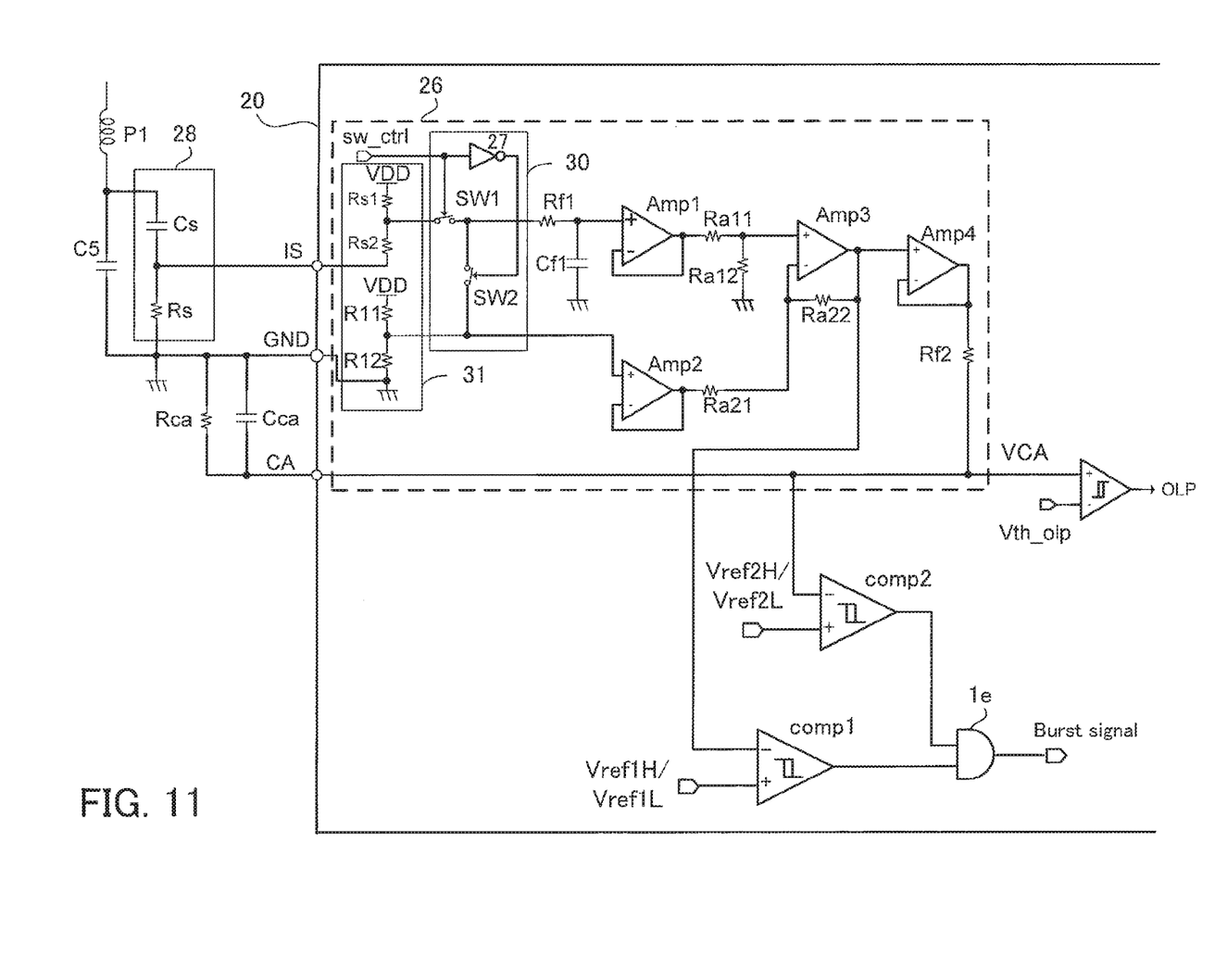
FIG. 11 is a circuit diagram illustrating a switching power supply device according to a variation.

Next, a switching power supply device according to a variation will be described. FIG. 11 is a circuit diagram illustrating a switching power supply device according to a variation. In FIG. 11, the constituent elements that are the same as or equivalent to those illustrated in FIGS. 2 and 9 will be denoted by the same reference characters, and detailed description thereof will be omitted as needed.

A signal sw_ctrl is applied to a control terminal of a switch sw1 and is also applied to a control terminal of a switch sw2 via an inverter circuit 27. One terminal of the switch sw1 and one terminal of the switch sw2 are connected to an IS terminal and a GND terminal of a control IC 20, respectively, via a level shift circuit 31.

This level shift circuit 31 includes resistors Rs1 and Rs2 connected in series with each other. One end of the resistor Rs1 is connected to a VDD terminal, which is a power supply terminal, and the other end of the resistor Rs2 is connected to the IS terminal. A connection point of the resistors Rs1 and Rs2 is connected to the switch sw1 in a switching circuit 30. In addition, the level shift circuit 31 includes resistors R11 and R12 connected in series with each other. One end of the resistor R11 is connected to the VDD terminal, and the other end of the resistor R12 is connected to the GND terminal. A connection point of the resistors R11 and R12 is connected to the switch sw2 in the switching circuit 30.

The level shift circuit 31 has a function of positively shifting the level of a signal IS representing a current Is obtained by current division and a GND level. Namely, since the amplitude of a signal IS, which is applied to the IS terminal of the control IC 20 as a resonance circuit formed by a resonance reactor and a resonance capacitor C5 resonates, oscillates in the positive and negative directions with respect to the GND level.

The level shift circuit 31 shifts the levels of the potentials of the IS terminal and the GND terminal in the positive direction by the oscillation amount in the negative direction. Thus, assuming that the voltage between the IS terminal and the GND terminal is ±Vis/2, the amplitude of the signal IS inputted to the switches sw1 and sw2 in the switching circuit 30 is shifted from ±Vis/2 to +Vis. Namely, a negative potential is not applied to the switches sw1 and sw2.

A connection point of the switches sw1 and sw2 in the switching circuit 30 is connected to one end of a resistor Rf1, and the other end of the resistor Rf 1 is connected to one end of a capacitor Cf1 and a non-inverting input of an amplifier (an operational amplifier) Amp1. The other end of the capacitor Cf1 is connected to GND (the GND terminal).

In FIG. 11, since formed in the control IC 20, the resistor Rf1 and the capacitor Cf1 form a filter having a small time constant. This filter has a function of reducing noise by the switches sw1 and sw2 in the switching circuit 30, rather than performing averaging on the output voltage of the switching circuit 30.

The amplifier Amp1 has an inverting input terminal and an output terminal that are connected to each other, forming a voltage follower. In contrast, a connection point of the switch sw2 in the switching circuit 30 and the level shift circuit 31 is connected to a non-inverting input of an amplifier (an operational amplifier) Amp2. This amplifier Amp2 has an inverting input terminal and an output terminal that are connected to each other, forming a voltage follower.

An output terminal of the amplifier Amp1 is connected to one end of a resistor Ra11, and the other end of the resistor Ra11 is connected to one end of a resistor Ra12 and a non-inverting input of an amplifier (an operational amplifier) Amp3. The other end of the resistor Ra12 is connected to GND. An output terminal of the amplifier Amp2 is connected to one end of a resistor Ra21, and the other end of the resistor Ra 21 is connected to an inverting input of the amplifier Amp3. The inverting input of the amplifier Amp3 is connected to an output terminal of the amplifier Amp3 via a resistor Ra22. In this way, the amplifier Amp3 forms a differential amplifier circuit that amplifies the potential difference between output voltages of the amplifiers Amp1 and Amp2. Assuming that the output voltage of the amplifier Amp1 is VA, the output voltage of the amplifier Amp2 is VB, Ra11=Ra21, and Ra12=Ra22, an output voltage VC of this differential amplifier circuit is calculated by (VA−VB)·K, wherein K is an amplification factor (K=Ra12/Ra11=Ra22/Ra21).

The output terminal of the amplifier Amp3 is connected to a non-inverting input of an amplifier (an operational amplifier) Amp4 and a negative input terminal of a hysteresis comparator comp1. The amplifier Amp4 has an inverting input terminal and an output terminal that are connected to each other, forming a voltage follower. The output terminal of the amplifier Amp4 is connected to a CA terminal of the control IC 20 via a resistor Rf2.

In addition, the CA terminal is connected to a negative input terminal of a hysteresis comparator comp2. In addition, the CA terminal is connected to one end of a capacitor Cca that performs averaging on a signal obtained by synthesizing a first signal corresponding to the signal IS and a GND-level second signal. The other end of the capacitor Cca is connected to GND. The capacitor Cca externally connected to the control IC 20 is connected in parallel with a resistor Rca.

In this configuration, the level of the signal IS and the GND level are shifted by the level shift circuit 31. After these level-shifted signals are transmitted through the switching circuit 30, the shifted levels are canceled by the differential amplifier circuit and are then averaged by the resistor Rf2 and the capacitor Cca. In addition, since the differential amplifier circuit can amplify the potential difference (VA-VB) between the output voltages of the amplifiers Amp1 and Amp2, the signal based on the small-level signal IS can be increased. Consequently, the load status can easily be detected.

In addition, since this switching power supply device realizes the automatic burst control signal generation function illustrated in FIGS. 9 and 10, the time taken from sudden change of the load to cancelation of the burst operation is shortened. Thus, the undershoot of the output voltage is reduced.

According to one aspect, the time taken from sudden change of the load to cancelation of the burst operation is shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor device, comprising:
   a first filter that generates a first output signal by performing first filtering processing on an input signal of the semiconductor device, the first filter having a first time constant;
   a second filter that generates a second output signal by performing second filtering processing on the first output signal, the second filter having a second time constant different from the first time constant;
   a first comparison circuit that compares the first output signal with a first threshold voltage, to thereby output a first level signal;
   a second comparison circuit that compares the second output signal with a second threshold voltage, to thereby output a second level signal; and
   an AND circuit that performs an AND operation on the first level signal and the second level signal,
   wherein the first comparison circuit is a first hysteresis comparator, and the second comparison circuit is a second hysteresis comparator, each of the first and second hysteresis comparators having a negative input terminal and a positive input terminal,
   wherein the first hysteresis comparator is configured to receive, via the negative input terminal thereof, the first output signal,
   wherein the second hysteresis comparator is configured to receive, via the negative input terminal thereof, the second output signal,
   wherein the first hysteresis comparator is configured to receive, via the positive input terminal thereof, the first threshold voltage that includes a first high potential level threshold voltage and a first low potential level threshold voltage,
   wherein the second hysteresis comparator is configured to receive, via the positive input terminal thereof, the second threshold voltage that includes a second high potential level threshold voltage and a second low potential level threshold voltage, and
   wherein the first high potential level threshold voltage is larger than the second high potential level threshold voltage, and the first low potential level threshold voltage is larger than the second low potential level threshold voltage.

2. The semiconductor device according to claim 1, wherein the first time constant of the first filter is smaller than the second time constant of the second filter.

3. A current resonance switching power supply device including a first switching element and a second switching element connected in series with each other, and a control circuit that alternately activates the first switching element and the second switching element, the current resonance switching power supply device comprising:
   a shunt circuit including a series circuit of a resonance reactor and a resonance capacitor connected in parallel with the second switching element, the shunt circuit being configured to:
      divide a resonance current that flows through the serially-connected resonance reactor and resonance capacitor,
      convert a current obtained by the division into a first voltage signal, and
      output the first voltage signal;
   a load detection circuit, including a switching circuit that performs switching between the first voltage signal and a second voltage signal that is a ground-level (GND) signal, to thereby generate a third voltage signal; and
   a burst control signal generation circuit that includes:
      a first filter that generates a first output signal by performing first filtering processing on the third voltage signal, the first filter having a first time constant,
      a second filter that generates a second output signal by performing second filtering processing on the first output signal, the second filter having a second time constant different from the first time constant,
      a first comparison circuit that compares the first output signal with a first threshold voltage, to thereby output a first level signal,
      a second comparison circuit that compares the second output signal with a second threshold voltage, to thereby output a second level signal, and
      an AND circuit that generates a burst control signal by performing an AND operation on the first level signal and the second level signal.

4. The switching power supply device according to claim 3, wherein the first time constant of the first filter is smaller than the second time constant of the second filter.

5. The switching power supply device according to claim 3,
   wherein the first comparison circuit is a first hysteresis comparator, and the second comparison circuit is a second hysteresis comparator, each of the first and second hysteresis comparators having a negative input terminal and a positive input terminal,
   wherein the first hysteresis comparator is configured to receive, via the negative input terminal thereof, the first output signal, wherein the second hysteresis comparator is configured to receive, via the negative input terminal thereof, the second output signal, wherein the first hysteresis comparator is configured to receive, via the positive input terminal thereof, the first threshold voltage that includes a first high potential level threshold voltage and a first low potential level threshold voltage, wherein the second hysteresis comparator is configured to receive, via the positive input terminal thereof, the second threshold voltage that includes a second high potential level threshold voltage and a second low potential level threshold voltage, wherein the first high potential level threshold voltage is larger than the second high potential level threshold voltage, and wherein the first low potential level threshold voltage is larger than the second low potential level threshold voltage.

* * * * *